(12) United States Patent
Peluso et al.

(10) Patent No.: US 10,064,052 B2
(45) Date of Patent: Aug. 28, 2018

(54) METHODS FOR AUTHENTICATING DEVICE-TO-DEVICE COMMUNICATION

(71) Applicant: QARDIO, INC., Walnut, CA (US)

(72) Inventors: Marco Peluso, London (GB); Rosario Iannella, Amsterdam (NL)

(73) Assignee: QARDIO, INC., Walnut, CA (US)

( * ) Notice: Subject to any disclaimer, the term of this patent is extended or adjusted under 35 U.S.C. 154(b) by 0 days.

(21) Appl. No.: 14/314,139

(22) Filed: Jun. 25, 2014

(65) Prior Publication Data
US 2014/0380419 A1  Dec. 25, 2014

Related U.S. Application Data

(60) Provisional application No. 61/838,992, filed on Jun. 25, 2013.

(51) Int. Cl.
*H04L 29/06* (2006.01)
*H04W 12/06* (2009.01)
(Continued)

(52) U.S. Cl.
CPC ............. *H04W 12/06* (2013.01); *H04L 29/06* (2013.01); *H04L 63/08* (2013.01); *H04L 63/10* (2013.01); *H04W 4/02* (2013.01); *H04W 76/14* (2018.02)

(58) Field of Classification Search
CPC . H04L 29/00872; H04L 29/06; H04L 463/10; H04L 463/08; H04W 12/06
See application file for complete search history.

(56) References Cited

U.S. PATENT DOCUMENTS 8,285,211 B2  10/2012  Wang et al.
8,380,977 B2  2/2013  Son et al.
(Continued)

FOREIGN PATENT DOCUMENTS

EP          2523481 A1   11/2012
WO       2014210122      12/2014

OTHER PUBLICATIONS

"Bluetooth Specification Version 4.0 Excerpt, Core System Package [BR/EDR Controller Volume], Part H", Inteernet Citation, Jun. 30, 2010 (Jun. 30, 2010), pp. 1055-1060, 1092, XP002699582, Retrieved from the Internet: URL:https://www.bluetooth.org/docman/handlers/downloaddoc.ashx?doc_id=229737 [retrieved on Jan. 11, 2012].

*Primary Examiner* — Hadi S Armouche
*Assistant Examiner* — Shaqueal D Wade
(74) *Attorney, Agent, or Firm* — Shartsis Friese LLP; Cecily Anne O'Regan (57) ABSTRACT

Devices and methods are described to enable devices to be paired in a convenient and secure way based on proximity with the use of a single radio transmission protocol. Using devices configurable to perform the processes described, users are able to pair Bluetooth enabled devices or other radio communication protocols simply by putting the devices briefly in contact, or within close proximity, usually few centimeters. When the two devices touch or are in close proximity, the encryption key is shared across the two devices without further interaction required by the user. The encryption key is not made visible, so one potential source of security breach is eliminated. After first setup, proximity is not required and the device can communicate securely based on the previously exchanged security tokens (and encryption keys) without the requirement of proximity. This method is hence superior to all other authentication methods (Continued)

in use as it combines the benefit of an easy setup/configuration with the use of secure communications and cheaper design and manufacturing.

9 Claims, 3 Drawing Sheets (51) Int. Cl.
  *H04W 76/14* (2018.01)
  *H04W 4/02* (2018.01)

(56) References Cited

U.S. PATENT DOCUMENTS

| | | | |
|---|---|---|---|
| 8,385,823 B2 | 2/2013 | Naniyat | |
| 8,432,262 B2 | 4/2013 | Talty et al. | |
| 8,457,552 B1 | 6/2013 | Linsky et al. | |
| 8,819,445 B2* | 8/2014 | Schrecker | G06F 21/31 |
| | | | 713/185 |
| 2008/0013601 A1 | 1/2008 | Lind et al. | |
| 2008/0039136 A1* | 2/2008 | Byun | H04W 99/00 |
| | | | 455/557 |
| 2008/0227393 A1* | 9/2008 | Tang | H04W 8/005 |
| | | | 455/41.3 |
| 2011/0053506 A1* | 3/2011 | Lemke | H04M 1/6075 |
| | | | 455/41.2 |
| 2011/0314153 A1 | 12/2011 | Bathiche et al. | |
| 2012/0015605 A1* | 1/2012 | Sole | H04W 12/06 |
| | | | 455/41.3 |
| 2012/0050153 A1 | 3/2012 | Dvortsov et al. | |
| 2013/0078922 A1 | 3/2013 | Griffin et al. | |
| 2014/0006784 A1* | 1/2014 | Walker | H04L 9/3273 |
| | | | 713/169 |
| 2014/0096179 A1* | 4/2014 | Ben-Shalom | H04L 63/0869 |
| | | | 726/1 |
| 2014/0306798 A1* | 10/2014 | Jeon | H04B 5/0062 |
| | | | 340/5.61 |
| 2015/0089091 A1 | 3/2015 | Tucker | |

* cited by examiner

METHODS FOR AUTHENTICATING DEVICE-TO-DEVICE COMMUNICATION

CROSS-REFERENCE

This application claims the benefit of U.S. Provisional Application No. 61/838,992, filed Jun. 25, 2013, entitled METHODS FOR AUTHENTICATING DEVICE TO DEVICE COMMUNICATION by Marco Peluso, et al., which application is incorporated herein by reference.

BACKGROUND OF THE INVENTION

Wireless communication systems facilitate connectivity and data and voice transport from point-to-point and point-to-multipoint bases. Exemplary wireless communication systems include "Bluetooth™ protocol" enabled systems that facilitate the transport of data between Bluetooth enabled devices such as wireless headsets, cellular phones, laptop computers and personal digital assistants (PDAs), and "IEEE 802 protocol" systems that facilitate the transport of data over wireless local area networks (WLANs), which include devices such as desktop and laptop computers.

As is well known, Bluetooth is a global specification standard for radio communications operating in the unlicensed Industrial, Scientific, and Medical (ISM) band at 2.4 GHz. Bluetooth enabled devices, which are devices that comply with the Bluetooth Specification, replace normal cable connections with short-range radio links. Bluetooth offers a secure, robust, low-complexity, low cost and low power cable-less connection solution. Bluetooth technology is featured in a wide range of applications including cordless telephony, intercom, facsimile (FAX) and Local Area Network (LAN) access, and dial-up networking applications, high-fidelity sound reproduction, digital imaging. Bluetooth wireless communication protocols are implemented in wireless headsets, cellular phones, PDAs, printers, and many other devices. Bluetooth technology is described in more detail in a number of specifications, the latest of which, published by the Bluetooth Special Interest Group (SIG), entitled "Bluetooth Core Specification Version 4.1", published on Dec. 3, 2013, is electronically available to the public via the well-known Internet at <http://www.Bluetooth.org>, the most common specification of which, entitled "Bluetooth Core Specification Version 4.0", published on Jun. 30, 2010 and subsequently updated and integrated with addenda on Dec. 27, 2011, Jul. 24, 2012, Feb. 12, 2013 and Dec. 3, 2013, is also published by the Bluetooth Special Interest Group (SIG), and is electronically available to the public from the same source, and together with its Supplement, referred to herein as the "Bluetooth Specification," and is hereby incorporated herein by reference in its entirety for its teachings on Bluetooth flow control, signals, devices and communication protocols and schemes. Current solutions for device-to-device communication include, for example, those disclosed in U.S. Pat. No. 8,457,552 B1 issued Jun. 4, 2013, for Method and Apparatus for Reduced Complexity Short Range Wireless Communication System by Linksy et al.; U.S. Pat. No. 8,432,262B2 issued Apr. 30, 2013, for Multiple Near Field Communication Tags in a Pairing Domain to Talty, et al.; U.S. Pat. No. 8,385,823 B2 issued Feb. 26, 2013, for Method and System for Communication in Near Field Communication Network to Naniyat; U.S. Pat. No. 8,380,977 B2 issued Feb. 19, 2013, for Peer-to-Peer Communication Method for Near Field Communication to Son, et al.; and U.S. Pat. No. 8,285,211 B2 issued Oct. 9, 2012, for Method and System for Improving Client Server Transmission Over Fading Channel with Wireless Location and Authentication Technology via Electromagnetic Radiation to Wang, et al. One important approach to classify wireless communication protocols is based on the ability to provide secure, or encrypted communications. In this respect, for example the Bluetooth communication protocols differentiates itself from other standards, like the NFC standard, which favors ease of use at the cost of eliminating the ability to provide secure communications. Near field communication (NFC) is a set of standards for smartphones and similar devices to establish low-bandwidth radio communication with each other by touching them together or bringing them into close proximity, usually no more than a few centimeters. NFC provides short-range wireless connectivity via electromagnetic (EM) radiation that uses magnetic field induction to enable communication between devices. Present and anticipated applications include contactless transactions, data exchange, and simplified setup of more complex communications such as Wi-Fi. Communication is also possible between an NFC device and an unpowered NFC chip, called a NFC tag. NFC standards cover communications protocols and data exchange formats, and are based on existing radio-frequency identification (RFID) standards including ISO/IEC 14443 and FeliCa. The standards include ISO/IEC 18092 and those defined by the NFC Forum.

For secure applications, in order to establish and authenticate a secure communication between two devices with standard pairing functionality, a user has to set a PIN number that allows two Bluetooth devices to agree on an encryption key. If the PIN number matches between the two devices, the encryption key is then sent from the device that wants to pair to the device that will accept the pairing. In order for the pairing to be established the user has to perform several steps to enter the identifying PIN number. This process is laborious and can be a deterrent to adoption of technology. With the introduction of low-energy radio communication protocols, aimed at the proliferation of connected devices (also known as "the internet of things"), the simplification of the process to authenticate secure communications across two or more devices is of paramount importance. Further, the encryption key is made visible during the process, which can lead to security breaches, and puts visually impaired users at a disadvantage. A variety of devices have been developed which enable communication based on proximity. However, none of the currently available solutions solves the problems addressed herein while providing the benefit of secure communication for sensitive information and data.

Alternative approaches combine the use of two radio communication protocols in order to achieve security and convenience. For example, the two devices that need to be paired are equipped with both Bluetooth radio and NFC radio: when pairing needs to be established, the two devices are moved in close proximity and the NFC radio allows to have an exchange of encryption keys. Such encryption keys can then be used to authenticate and secure communications between the two devices with Bluetooth radio protocol. This alternative approach offers a convenient method for establishing secure communications, but introduces unnecessary complexity in the design of both the hardware and software of the devices that adopt it as it requires two radios, and is a potential source of incompatibilities, limiting the interoperability across different devices.

What is needed are methods and systems for pairing devices that will be wirelessly and securely connected which is convenient, efficient, simple and economical.

In other words, the current state of the art is as follows: 1) communication methods that do not support secure (encrypted) communications and are only suitable for applications that do not require security. These do not require authentication and typically easy to setup or require no setup. 2) communication methods that do not support, or have limited support for security but mitigate security risk and are hence suitable for only certain applications that require security, these include proximity-based communications protocols, like NFC, which mitigate the security risk by use of very-low-power radios that limit the risk of detection by a third party and are typically easy to setup or require no setup. 3) Communication methods that support security and are hence suitable for a wide range of secure or non-secure communications, but require lengthy and/or inconvenient configuration processes, like exchange of passwords or PIN codes. These include certain Wi-Fi communication methods and Bluetooth. 4) Communications methods that combine 2) and 3) above as they leverage proximity-based exchange of authentication tokens, for example via NFC to then enable encryption key exchange and secure communication typically over Wi-Fi or Bluetooth. This last approach is costly and inefficient as it required the implementation of two different radios in the devices and one of the two radios is only used during the setup (or configuration) stage.

SUMMARY OF THE INVENTION

Devices and methods are described to enable devices to be paired in a convenient and secure way based on proximity with the use of a single radio transmission protocol. Using devices configurable to perform the processes described, users are able to pair Bluetooth enabled devices or other radio communication protocols simply by putting the devices briefly in contact, or within close proximity, usually within a few centimeters. When the two devices touch or are in close proximity, the encryption key is shared across the two devices without further interaction required by the user. The encryption key is not made visible, so one potential source of security breach is eliminated. After first setup, proximity is not required and the device can communicate securely based on the previously exchanged security tokens (and encryption keys) without the requirement of proximity. This method is hence superior to all other authentication methods as it combines the benefit of an easy setup/configuration with the use of secure communications and cheaper design and manufacturing.

Moreover, visually impaired users are no longer disadvantaged by the need to enter a PIN. Thus, pairing of devices is less laborious and more intuitive, and more user-friendly.

Modern wireless communication protocol have various features supporting the quality of the communication interchange. Typical features would include, for example, transmission verification, error management, data compression, security, adaptive throughput, quality of signal and many others. These features can be used, for example, to allow a communication system to evaluate if the low performance of a certain connection is due to poor signal or to interferences or both. Every electronic system for wireless communications will either be secure or not secure. The systems and methods of the disclosure are not concerned with the radio communication protocol or standard (Wi-Fi, Bluetooth, or other), or the type of data, the distance across which the wireless communication takes place, frequencies or other features of the radio communication system. Disclosed are methods of authentication for the setup/configuration of secure communication. A secure system will require exchanging of one or more authentication tokens, which will contain various identifying information, including, typically, encryption keys. The exchange of authentication tokens (also known as pairing) is crucial to establish that a device is communicating only to another "legitimate" device and not to a third "unauthorized" device. Subsequent to the first authentication (e.g., the setup), the two devices can automatically recognize and authenticate each other. The systems and methods provide for secure wireless communications that establishes the configuration/pairing/setup/exchange of authentication tokens using proximity as user-driven authentication method.

An aspect of the disclosure is directed to an electronic system for wirelessly and securely authenticating between one or more primary devices and secondary devices during a first time pairing between when the devices are proximate. The system comprises: one or more first or primary devices wherein each of the one or more first devices has a first device memory and a first device secure communications component that uses a first unique electromagnetic communication identifier corresponding to the first device in connection with establishing a secure communication channel from the first device; and one or more second or secondary devices wherein each of the one or more second devices has a second device memory and a second device secure communications component that uses a second unique electromagnetic communication identifier corresponding to the second device in connection with establishing a secure communication channel with the first device, wherein the first device and the second device are wirelessly and securely authenticated during the first time pairing when the first device is positioned within a wireless communication distance to the second device and further wherein the first device and the second device are wirelessly and securely authenticated automatically when the first device and the second device are within a wireless communication distance. Each of the one or more second devices further comprises a transmission power monitor. Additionally, each of the one or more first devices is configurable to request a pairing with each of the one or more second devices. The request for pairing can be automatic; e.g. automatically occur when a device is powered on or an application on a device is started. In some configurations, the second device is configurable to validate a signal strength from the first device. In still other configurations, a power present in a radio signal is measured. Pairing can be achieved when a received signal strength indication is within a defined range, such as when the defined range includes a trigger level. In at least some configurations, the trigger level can be modified dynamically based on information received from the second device. In other configurations, the trigger level can be modified dynamically based on information coming from the surrounding environment. Where the trigger level is modified dynamically, dynamic modification can also be based on information coming from a surrounding environment.

Another aspect of the disclosure is directed to a method for facilitating electronic communication among two or more wireless devices. The method comprises: receiving from one or more of a first device wherein each of the one or more first devices have a first device memory and a first device secure communications component that uses a first unique electromagnetic communication identifier corresponding to the first device in connection with establishing a secure communication channel for transmitting data from the first device; and sending information from the one or more first devices to one or more second devices. In some configurations, the one or more secondary devices further comprises a transmission power monitor or gauge. Additionally, the at least one first device is configurable to request a pairing with one or more of the at least one second device. In some configurations, the method further comprises a step of validating a signal strength from one or more of the at least one first device. A power present in a radio signal can also be measured. Pairing can be achieved when a received signal strength indication is within a defined range, such as where the defined range includes a certain trigger level.

Still another aspect of the disclosure is directed to a machine readable medium containing instructions that, when executed by a computing device, cause the computing device to perform a method of pairing one or more primary devices with one or more secondary devices. The method comprises: receiving from a one or more first devices each having a first device memory and a first device secure communications component that uses a unique short range electromagnetic communication identifier corresponding to the first device in connection with establishing a secure communication channel for transmitting data from the first device; and sending information from the one or more first devices to one or more secondary devices. Additionally, the method can include validating a one or more signal strengths from the one or more first devices.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

Figure 1A:
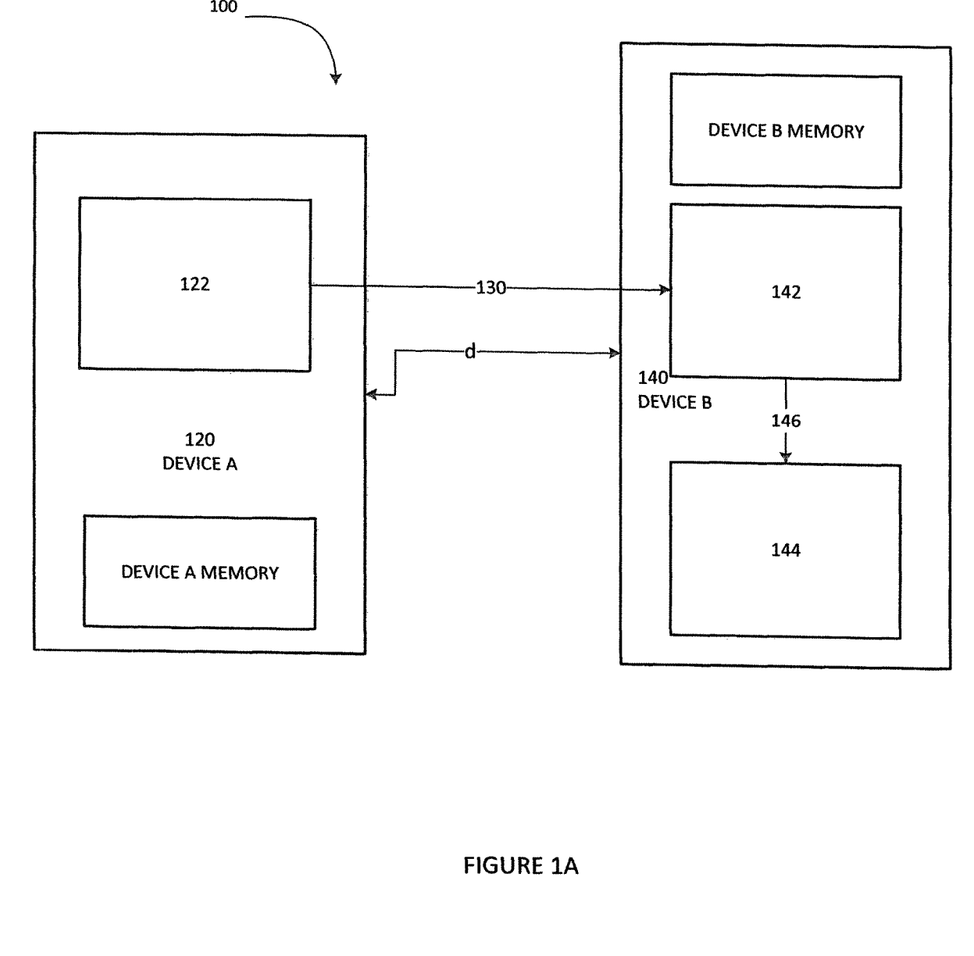
FIGS. 1A-B are block diagrams of systems of the disclosure showing a one-to-one device communication, and a one-to-many device configuration.

FIG. 1A is a block diagram of a system 100 which has a primary device 120, Device A which is, for example, a device requesting pairing. Device A 100 features Bluetooth capability 122, either incorporated directly into the primary device 120 or associated with the primary device 120 using an external accessory configurable to be in communication with the primary device 120. A secondary device 140, such as Device B, is a secondary device 140 that is configurable to accept a pairing from the primary device 120. Secondary device B 140 similarly has, for example, wireless communication capability 142, such as Bluetooth capability, either incorporated directly into the secondary device 140 or associated with the secondary device using an external accessory. Secondary device B 140 is configurable such that secondary device B 140 can validate a distance d between the primary device 120 and the secondary device 140. Such distance measurement is made by reference to a received signal strength indicator (RSSI) of a Bluetooth radio signal. RSSI is a measurement of the power present in a received radio signal. Additionally, Device B 140 features a transmission power controller 144. As will be appreciated by those skilled in the art, disclosed methods could be used by most devices that use secure wireless communications including, for example: in-car audio communication system for music, in-car hands-free audio communication system for telephony, wireless headsets, cellphones, PDAs, printers, keyboards, computer mice, and other radio-controlled devices (for example, for home automation). This technique could potentially be applicable to existing device with certain modifications of the software and/or the hardware, depending on the case. There is no limitation on the radio operating frequency, the key requisites of applicability of this method are: 1) possibility to bring the two devices in proximity to each other, 2) need to establish a secure radio communication (when secure pairing is not required, the application of this method is not advantageous). The determination of the primary vs. secondary device (also known as master vs. slave) is a function of the particular application of the device as well as the radio-protocol, and not intrinsic to this method. This method would be equally applicable not only to one-to one, but also to one-to-many, or to many-to-many (mesh) communication networks.

In operation, upon first configuration, soft reset, or factory reset, the primary device 120, Device A, requests pairing to the secondary device 140, Device B. In response to the request for pairing, Device B checks pairing by validating a received signal strength from Device A and measuring the power present in a received radio signal from Device A. Measurement can be by any suitable mechanism. For example, most digital radio systems provide an indication of the signal strength received. If Device A is proximate to Device B, e.g., is touching or is within a vicinity of few centimeters, Device B accepts the Bluetooth configuration (also known as pairing) request, exchanges the authentication tokens and encryption keys, and establishes secure communication between Device A and Device B. Depending on the application and/or the communications standard adopted, one or more devices can be subsequently added-into the device pairing established between Device A and Device B. Furthermore, the two (or more) devices can adapt their configuration behavior in consideration of external factor, including, for example, the number of other wireless devices transmitting in the vicinity, the type or form factor of the other devices. After the configuration (also known as pairing), for the first secure authentication is established, subsequent secure connections (secure authentications) can be established between the two (or more devices) automatically, without requiring proximity, by virtue of automatic exchange of one or more appropriate authentication token(s) containing one or more encryption key(s).

Figure 1B:
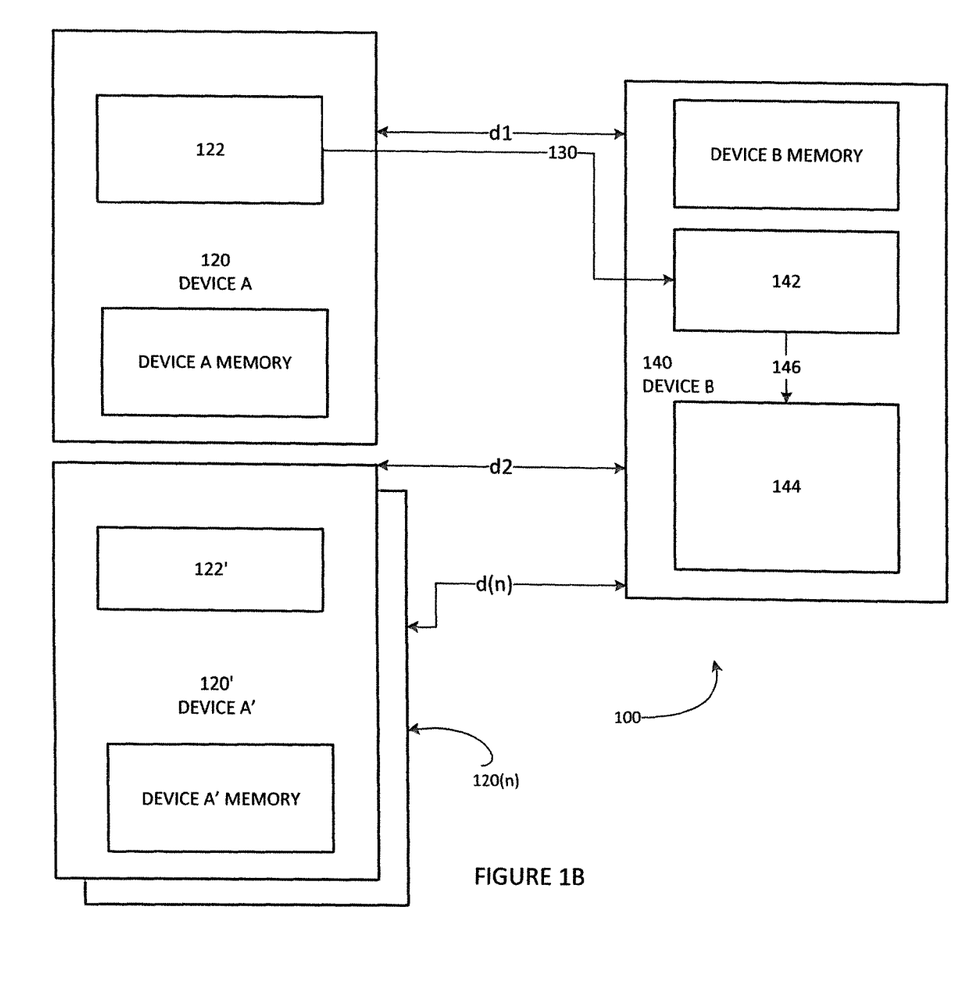

FIG. 1B is a block diagram of a system 100 which has a plurality of primary devices 120, 120', 120(n). Each primary device features wireless capability 122, 122', which is either incorporated directly into the primary device 120, 120' or associated with the primary device 120, 120' using an external accessory configurable to be in communication with the primary device 120, 120'. A secondary device 140, such as Device B, is a secondary device 140 that is configurable to accept a pairing from the primary device 120. Secondary device B 140 similarly has, for example, wireless communication capability 142, such as Bluetooth capability, either incorporated directly into the secondary device 140 or associated with the secondary device using an external accessory. Secondary device B 140 is configurable such that secondary device B 140 can validate a distance d1 between the primary device 120 and the secondary device 140; distance d2 between the primary device 120' and the secondary device 140; and distance d(n) between the primary device 120(n) and the secondary device 140. Such distance measurement is made by reference to a received signal strength indicator (RSSI) of a Bluetooth radio signal. RSSI is a measurement of the power present in a received radio signal. Additionally, Device B 140 features a transmission power controller 144. As will be appreciated by those skilled in the art, disclosed methods could be used by most devices that use secure wireless communications including, for example: in-car audio communication system for music, in-car hands-free audio communication system for telephony, wireless headsets, cellphones, PDAs, printers, keyboards, computer mice, and other radio-controlled devices (for example, for home automation). This technique could potentially be applicable to existing device with certain modifications of the software and/or the hardware, depending on the case. There is no limitation on the radio operating frequency, the key requisites of applicability of this method are: 1) possibility to bring the two devices in proximity to each other, 2) need to establish a secure radio communication (when secure pairing is not required, the application of this method is not advantageous). The determination of the primary vs. secondary device (also known as master vs. slave) is a function of the particular application of the device as well as the radio-protocol, and not intrinsic to this method. This method would be equally applicable not only to one-to one, but also to one-to-many, or to many-to-many (mesh) communication networks. As will be appreciated by those skilled in the art, one or more primary devices can be paired with one or more secondary devices using the process described herein.

Figure 2:
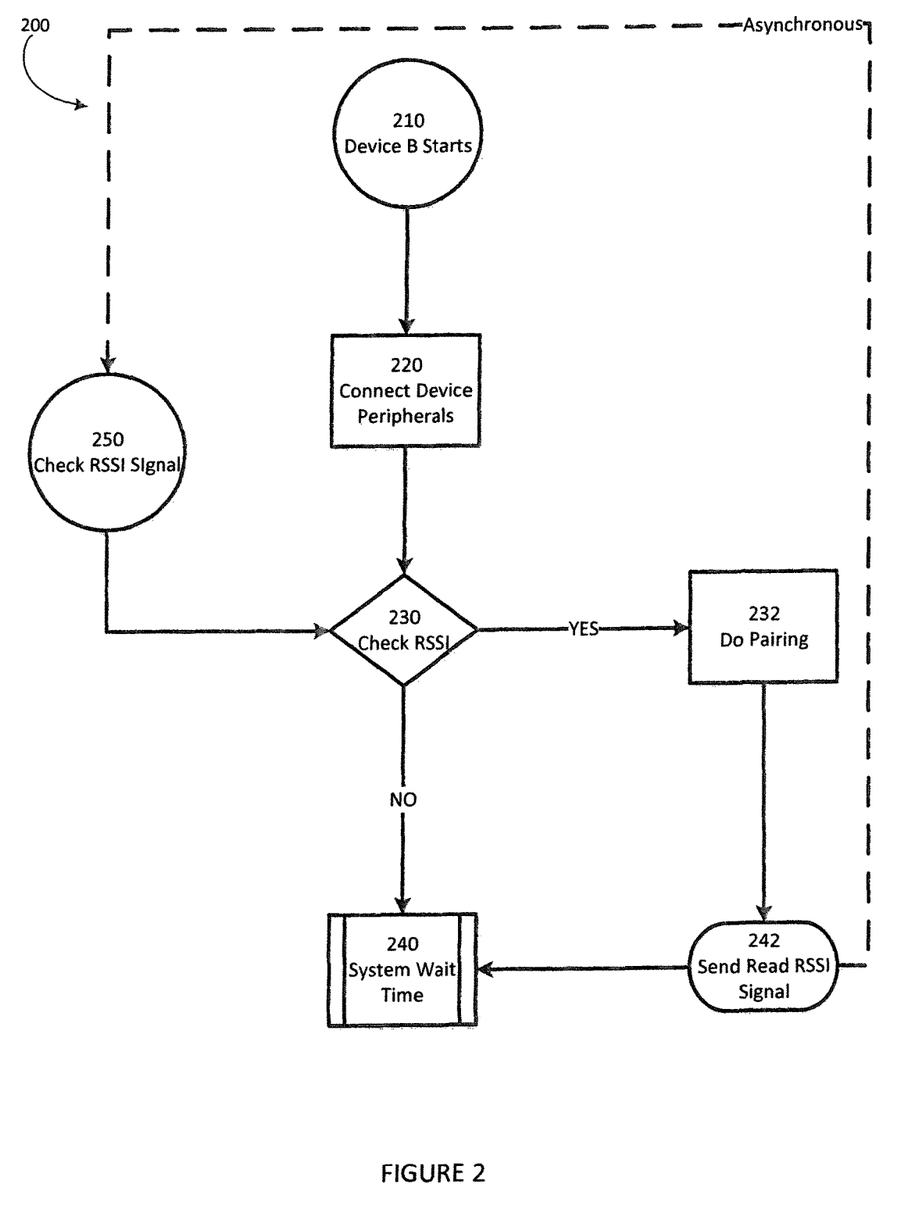
FIG. 2 is diagram illustrating operation of the devices operating in the system.

Turning to FIG. 2 a process of operation 200 is illustrated. In response to receiving a request from Device A 120 (FIG. 1), Device B 140 (FIG. 1) starts 210. In determining whether to connect the devices 220, the received signal strength indication (RSSI) is checked 230, if the signal is within a defined range or trigger level (e.g., −0.45f) (YES), then pairing is permitted 232. A suitable range for the signal strength is set based on the performance of the radio, the enclosure (form factor), use/application of the device and/or other external factors. The optimal strength is defined by the device manufacturer during the design, manufacturing, calibration, or quality testing stage of the device, but it can also be subsequently changed from time to time statically or dynamically, depending on several factors: the two (or more) devices can adapt their configuration behavior in consideration of external factor, including, for example, the number of other wireless devices transmitting in the vicinity, the type or form factor of the other devices. If the RSSI level is not detected at or above trigger level (NO), then the system 200 waits a period of time (e.g., 50 mS) 240 before sending a read RSSI signal 242 and re-checking the signal 250 to determine if the signal is of sufficient strength to permit pairing. This process can be repeated for a set period of time or a set period of attempts.

The first step of the process requires one or more devices broadcasting wireless signals and one or more devices listening to wireless signals. This step is initiated in Device A by one or more devices and can be continuously ongoing, or be triggered by certain user actions or other non-user generated events. For example, the user can activate the process by interacting on a touch-screen user interface, switching on a device, or pushing a button, or wearing a sensor, or igniting a car engine, or shaking or moving or rotating one (or more) of the devices. Non-user generated events could include, for example, changes in magnetic fields, or changes in lighting conditions, or contact with water or other substances. In step two, the user confirms the pairing process by bringing device A and B (or more devices, simultaneously, or in any number at a time) in proximity. The two or more devices then share the authentication token(s) with the encryption key(s). From then one the two devices can initiate communications automatically, or based on user trigger (or other event), without requiring proximity. This simplifies the configuration process, while maintaining secure communications.

As will be appreciated by those skilled in the art, a computer readable medium stores computer data, which data can include computer program code that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable storage media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

Some embodiments may be implemented in one or a combination of hardware, firmware and software. Embodiments may also be implemented as instructions stored on a non-transitory computer-readable storage medium, which may be read and executed by at least one processor to perform the operations described herein. A non-transitory computer-readable storage medium may include any mechanism for storing information in a form readable by a machine (e.g., a computer). For example, a non-transitory computer-readable storage medium may include read-only memory (ROM), random-access memory (RAM), magnetic disk storage media, optical storage media, flash-memory devices, and other non-transitory media.

By way of example, Bluetooth products may be used to provide links between mobile computers, mobile phones, portable handheld devices, personal digital assistants (PDAs), and other mobile devices and connectivity to the Internet. Bluetooth is a computing and telecommunications industry specification that details how mobile devices can easily interconnect with each other and with non-mobile devices using a short-range wireless connection. Bluetooth creates a digital wireless protocol to address end-user problems arising from the proliferation of various mobile devices that need to keep data synchronized and consistent from one device to another, thereby allowing equipment from different vendors to work seamlessly together.

An IEEE standard, IEEE 802.11, specifies technologies for wireless LANs and devices. Using 802.11, wireless networking may be accomplished with each single base station supporting several devices. In some examples, devices may come pre-equipped with wireless hardware or a user may install a separate piece of hardware, such as a card, that may include an antenna. By way of example, devices used in 802.11 typically include three notable elements, whether or not the device is an access point (AP), a mobile station (STA), a bridge, a personal computing memory card International Association (PCMCIA) card (or PC card) or another device: a radio transceiver; an antenna; and a MAC (Media Access Control) layer that controls packet flow between points in a network.

EXAMPLES

A user selects a primary device for use, the user then brings the primary device within range of a secondary device. If not already activated, the user activates the wireless communication on the secondary device (e.g. Bluetooth). An application downloaded onto the secondary device (e.g., downloaded onto a phone or tablet) is then activated. With the app activated and the primary device in proximity to the secondary device the primary device then requests pairing with the secondary device. A prompt is displayed to the user. Upon confirming the validation, the secondary device validates the distance of the devices and either permits or denies the pairing. When pairing is permitted, the primary device wirelessly communicates with the secondary device to share information. Communications between the primary device and the secondary device are encrypted. As will be appreciated by those skilled in the art, the specific implementation of the encryption process is a function of the particular communication and security method used (e.g. Bluetooth 3.0, Bluetooth 4.0, Wi-Fi in its various standards).

A user selects one or more primary devices for use, the user then brings the one or more primary devices within range (either sequentially or concurrently) of a secondary device. If not already activated, the user activates the wireless communication on the secondary device (e.g. Bluetooth). An application downloaded onto the secondary device (e.g., downloaded onto a phone or tablet) is then activated. With the app activated and the one or more primary devices in proximity to the secondary device the primary devices then each request pairing with the secondary device. A prompt is displayed to the user. Upon confirming the validation of each pairing, the secondary device validates the distance of each of the one or more primary devices and either permits or denies the pairing. When pairing is permitted, the one or more primary devices wirelessly communicate with the secondary device to share information. In some configurations, the primary devices can share information between the primary device, e.g. via the secondary device. Communications between the primary devices and the secondary device are encrypted. As will be appreciated by those skilled in the art, the specific implementation of the encryption process is a function of the particular communication and security method used (e.g. Bluetooth 4.0, Wi-Fi in its various standards).

A user selects a primary device for use, the user then brings the primary device within range of a secondary device. The primary device then requests pairing with the secondary device. The secondary device validates the distance of the devices and either permits or denies the pairing. When pairing is permitted, the primary device wirelessly communicates with the secondary device to share information. All the communications are encrypted. How this is specifically done is a function of the particular communication and security method used (e.g. Bluetooth 4.0, Wi-Fi in its various standards)

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. An electronic system for wirelessly and securely authenticating pairing between one or more first devices and one or more second devices comprising:
   one or more first devices, wherein each of the one or more first devices has a first device memory and a first device secure communications component that uses a first unique electromagnetic communication identifier corresponding to the first device in connection with establishing a secure communication channel from the first device;
   one or more second devices, wherein each of the one or more second devices has a second device memory and a second device secure communications component that uses a second unique electromagnetic communication identifier corresponding to the second device in connection with establishing a secure communication channel with the first device;
   code to request a pairing by the one or more first devices to the one or more second devices;
   code to validate a received signal strength at or above a trigger level using a radio transmission protocol from the one or more first devices by the one or more second devices by measuring a power present in a radio signal received by the one or more first devices;
   when the received signal strength of the one or more first devices confirms a physical proximity during a first pairing that is at least one of adjacent and within threshold centimeters of the one or more second devices, code to accept the pairing request and download an application onto at least one of the one or more first devices and the one or more second devices;
   code to exchange authentication tokens between the one or more first devices and the one or more second devices without manual entry of information by a user;
   code to automatically authenticate the one or more first devices with the one or more second devices during a subsequent pairing using the radio transmission protocol without requiring the received signal strength indication to be at or above the trigger level.

2. The electronic system of claim 1, wherein each of the one or more second devices further comprises a transmission power monitor.

3. The electronic system of claim 1, wherein the request for pairing is automatic.

4. The electronic system of claim 1, wherein the trigger level is modified dynamically based on information received from the one or more second devices.

5. The electronic system of claim 1, wherein the trigger level is modified dynamically based on information coming from a surrounding environment.

6. The electronic system of claim 4, wherein the trigger level is modified dynamically also based on information coming from a surrounding environment.

7. A method for facilitating electronic communication among wireless devices comprising:
- receiving a signal from one or more first devices, wherein each of the one or more first devices have a first device memory and a first device secure communications component that uses a first unique electromagnetic communication identifier corresponding to the first device in connection with establishing a secure communication channel for transmitting data from the first device;
- validating a received signal strength at or above a trigger level from the one or more first devices using a radio transmission protocol;
- downloading an application onto at least one of the one or more first devices and one or more second devices during a first time pairing between the one or more first devices and the one or more second devices once the one or more first devices is at least one of adjacent and within threshold centimeters to the one or more second devices;
- sharing an authentication token between the one or more first devices and the one or more second devices without visibility to a user during the first time pairing;
- activating the downloaded application on the one or more first devices;
- requesting a subsequent pairing between the one or more first devices with the one or more second devices without manual entry of information by the user when the one or more first devices is no within physic proximity of the one or more second devices and is within a radio communication distance of the one or more second device;
- sending information from the one or more first devices to one or more second devices; and
- authenticating automatically during the subsequent wireless pairing using the radio transmission protocol without requiring the received signal strength indication to be at or above the trigger level.

8. The method for facilitating electronic communication among wireless devices of claim 7, wherein the second device further comprises a transmission power monitor.

9. The method for facilitating electronic communication among one or more first devices and one or more second devices of claim 7, wherein a power present in a radio signal is measured.

* * * * *